(12) United States Patent
Sekiguchi et al.

(10) Patent No.: US 9,810,159 B2
(45) Date of Patent: Nov. 7, 2017

(54) METHOD AND APPARATUS FOR CONTROLLING GAS TURBINE COMBUSTOR

(71) Applicant: Mitsubishi Hitachi Power Systems, Ltd., Nishi-ku, Yokohama, Kanagawa (JP)

(72) Inventors: Tatsuya Sekiguchi, Hitachinaka (JP); Shouhei Yoshida, Hitachiota (JP); Yoshitaka Hirata, Tokai (JP); Akinori Hayashi, Hitachinaka (JP); Nozomi Saitou, Hitachinaka (JP); Kazuo Takahashi, Hitachi (JP); Takeo Saitou, Hitachinaka (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 223 days.

(21) Appl. No.: 14/621,575

(22) Filed: Feb. 13, 2015

(65) Prior Publication Data

US 2015/0159562 A1    Jun. 11, 2015

Related U.S. Application Data

(62) Division of application No. 13/213,263, filed on Aug. 19, 2011, now abandoned.

(30) Foreign Application Priority Data

Sep. 6, 2010  (JP) .................................. 2010-198518

(51) Int. Cl.
*F02C 9/28*  (2006.01)
*F02C 9/26*  (2006.01)
*F02C 9/46*  (2006.01)

(52) U.S. Cl.
CPC ................ *F02C 9/263* (2013.01); *F02C 9/28* (2013.01); *F02C 9/46* (2013.01); *F05D 2270/091* (2013.01)

(58) Field of Classification Search
CPC ...... F02C 9/26; F02C 9/28; F02C 9/46; F02C 9/48; F01D 21/02; F01D 21/06; F05D 2270/021; F05D 2270/091; F05D 2270/31
(Continued)

(56) References Cited

U.S. PATENT DOCUMENTS

| 3,639,076 A | 2/1972 | Rowen |
| 4,045,955 A | 9/1977 | Brannstrom et al. |

(Continued)

FOREIGN PATENT DOCUMENTS

| JP | 10-169467 A | 6/1998 |
| JP | 2002-138856 A | 5/2002 |

OTHER PUBLICATIONS

Japanese Office Action with English Translation dated Jan. 22, 2013 (six (6) pages).

*Primary Examiner* — Arun Goyal
(74) *Attorney, Agent, or Firm* — Crowell & Moring LLP

(57) ABSTRACT

An apparatus for controlling a gas turbine combustor having a diffusion combustion burner and a premix combustion burner comprising: a rotating speed detector for detecting a rotating speed of gas turbine, a recorder for recording the detected value of the rotating speed of gas turbine detected by the rotating speed detector, an arithmetic unit for calculating a change with time of the rotating speed of gas turbine in accordance with details of the detected value of the rotating speed of gas turbine recorded in the recorder, and a fuel control unit for judging a starting situation of reduction in the rotating speed of gas turbine on the basis of the change with time of the rotating speed of gas turbine calculated by the arithmetic unit and controlling respectively a fuel flow (Continued)

rate for the diffusion combustion burner to be fed to the diffusion combustion burner installed in the gas turbine combustor and a fuel flow rate for the premix combustion to be fed to the premix combustion burner.

1 Claim, 13 Drawing Sheets

(58) Field of Classification Search
 USPC ..... 60/39.091, 39.19, 39.281, 737, 779, 790
 See application file for complete search history.

(56) References Cited

U.S. PATENT DOCUMENTS

| | | |
|---|---|---|
| 4,783,957 A | 11/1988 | Harris |
| 5,321,947 A | 6/1994 | Sood et al. |
| 5,372,008 A | 12/1994 | Sood |
| 9,228,501 B2 * | 1/2016 | Oliverio .................. F02C 9/18 |

* cited by examiner

METHOD AND APPARATUS FOR CONTROLLING GAS TURBINE COMBUSTOR

CROSS REFERENCE TO RELATED APPLICATIONS

This application is a division of U.S. application Ser. No. 13/213,263, filed Aug. 19, 2011, which claims priority from Japanese patent application JP 2010-198518 filed on Sep. 6, 2010, the disclosures of which are expressly incorporated by reference herein.

BACKGROUND OF THE INVENTION

Field of the Invention

The present invention relates to a method and an apparatus for controlling a gas turbine combustor.

Description of Related Art

In the gas turbine combustor, there are a diffusion combustor and a premix combustor available. The diffusion combustor is a system for separately feeding and burning fuel and air in a combustion chamber, and a flame is formed in a state close to the stoichiometric ratio of fuel to air, and the local flame temperature rises, so that although the combustion stability is high, the nitrogen oxide (NOx) emission increases.

On the other hand, the premix combustor is a system for premixing fuel and air and then feeding and burning them in the combustion chamber, and the mixing ratio of fuel and air on the flame sheet is lower than that in the diffusion combustion, and the local flame temperature is lowered, so that the emission of NOx can be reduced.

As general use of a low NOx combustor, at the time of a low load operation from start up to acceleration, the diffusion combustion of high combustion stability is used and at the time of the base load operation from a partial load, the diffusion combustion of high combustion stability and the premix combustion capable of reducing the NOx emission are combined, thus the combustion stability and the reduction in the NOx discharging rate are compatible with each other.

When using the gas turbine for power generation, the gas turbine needs to withstand a load dump when the load operation state is transferred to the no-load operation state due to separation of the generator from the gas turbine. The load dump is to urgently separate the generator and turbine from each other from some cause and in this case, the gas turbine needs to immediately enter the full speed no-load operation state.

Immediately after the load dump, the rotating speed of the gas turbine increases. If the rotating speed of the gas turbine increases to the limit value or higher, there is a concern that it may lead to damage to the compressor or turbine and it is necessary to promptly reduce the fuel flow rate to the minimum limit capable of maintaining the flame by the gas turbine combustor, thereby suppressing an increase in the rotating speed of the gas turbine.

Due to the increase in the rotating speed of the gas turbine in correspondence to the load dump, the flow rate of compressed air flowing into the gas turbine combustor increases, and the fuel flow rate reduces suddenly, so that the inner state of the gas turbine combustor is transiently greatly changed. Therefore, in the gas turbine combustor, high combustion stability is required, and when reducing the fuel flow rate at the time of load dump, so as to dump the fuel for premix combustion, thereby switch to the independent diffusion combustion, the fuel flow rate is controlled.

In Japanese Patent Laid-open No. Hei 10 (1998)-169467 of a prior art, at the time of load dump of the gas turbine, an art capable of switching the premix combustion to the independent diffusion combustion without delay of ignition is disclosed.

Patent Document 1: Japanese Patent Laid-open No. Hei 10 (1998)-169467

SUMMARY OF THE INVENTION

The regulation and social demands on the environment become stronger day by day and also in the gas turbine combustor, a further reduction in the NOx emission is required. In the base load operation state from the partial load of the gas turbine, the combustion of the gas turbine combustor is switched to the mixed combustion of the diffusion combustion and premix combustion, thus the NOx emission rate can be reduced.

Further, in the gas turbine, to suppress the increase in the rotating speed due to the load dump, the fuel for the premix combustion is dumped at the time of load dump and so as to switch to the independent diffusion combustion, the fuel flow rate fed to the gas turbine combustor is controlled.

In Japanese Patent Laid-open No. Hei 10 (1998)-169467 aforementioned, at the time of load dump of the gas turbine, the art capable of switching the premix combustion to the independent diffusion combustion without delay of ignition is disclosed, though the time required to return from the load dump to the ordinary operation state depends upon the cause of the load dump and there is a possibility that the full speed no-load operation state after the load dump may be held for many hours.

When the full speed no-load operation state after the load dump is held for many hours, the independent diffusion combustion state of a high NOx emission is continued, so that an increase in the NOx emission due to the full speed no-load operation state after the load dump causes a problem.

An object of the present invention is to provide a method and an apparatus for controlling a gas turbine combustor capable of ensuring combustion stability immediately after load dump of the gas turbine and reducing the NOx emission due to full speed no-load operation after the load dump.

An apparatus for controlling a gas turbine combustor having a diffusion combustion burner and a premix combustion burner comprising: a rotating speed detector for detecting a rotating speed of gas turbine, a recorder for recording the detected value of the rotating speed of gas turbine detected by the rotating speed detector, an arithmetic unit for calculating a change with time of the rotating speed of gas turbine in accordance with details of the detected value of the rotating speed of gas turbine recorded in the recorder, and a fuel control unit for judging a starting situation of reduction in the rotating speed of gas turbine on the basis of the change with time of the rotating speed of gas turbine calculated by the arithmetic unit and controlling respectively a fuel flow rate for the diffusion combustion burner to be fed to the diffusion combustion burner installed in the gas turbine combustor and a fuel flow rate for the premix combustion to be fed to the premix combustion burner.

An apparatus for controlling a gas turbine combustor having a diffusion combustion burner and a premix combustion burner comprising: a detector for detecting a rotating speed of gas turbine, a recorder for recording the detected value of the rotating speed of gas turbine detected by the rotating speed detector, an arithmetic unit for calculating a change with time of the rotating speed of gas turbine in accordance with details of the detected value of the rotating speed of gas turbine recorded in the recorder, a bleed valve opening angle detector for detecting an opening angle of a compressor bleed valve installed in a compressor, a logic circuit for checking a value of the change with time of the rotating speed of gas turbine calculated by the arithmetic unit and an opening angle signal of the bleed valve detected by the bleed valve opening angle detector, and a fuel control unit for respectively controlling a fuel flow rate for the diffusion combustion burner to be fed to the diffusion combustion burner installed in the gas turbine combustor and a fuel flow rate for the premix combustion to be fed to the premix combustion burner so as to switch a combustion state of the gas turbine combustor from independent diffusion combustion by the diffusion combustion burner to mixed combustion of diffusion combustion and premix combustion by the diffusion combustion burner and the premix combustion burner on the basis of check results by the logic circuit.

An apparatus for controlling a gas turbine combustor having a diffusion combustion burner and a premix combustion burner comprising: a fuel control unit for respectively controlling a fuel flow rate for the diffusion combustion burner to be fed to the diffusion combustion burner installed in the gas turbine combustor and a fuel flow rate for the premix combustion to be fed to the premix combustion burner so as to switch a combustion state of the gas turbine combustor from independent diffusion combustion by the diffusion combustion burner to mixed combustion of diffusion combustion and premix combustion by the diffusion combustion burner and the premix combustion burner on the basis of a signal transmitted from a timer circuit, which is installed to transmit a signal for controlling the fuel control unit after a predetermined period of time after receipt of a load dump signal of gas turbine, after a predetermined period of time.

A method for controlling a gas turbine combustor including a diffusion combustion burner and a premix combustion burner, comprising the steps of: detecting a rotating speed of gas turbine, recording the detected value of the rotating speed of gas turbine, calculating a change with time of the rotating speed of gas turbine in accordance with details of the recorded detected value of the rotating speed of gas turbine, judging a starting situation of reduction in the rotating speed of gas turbine on the basis of the calculated change with time of the rotating speed of gas turbine, and regulating a fuel flow rate fed to the gas turbine combustor controls respectively a fuel flow rate for the diffusion combustion burner to be fed to the diffusion combustion burner installed in the gas turbine combustor and a fuel flow rate for the premix combustion to be fed to the premix combustion burner.

A method for controlling a gas turbine combustor including a diffusion combustion burner and a premix combustion burner, comprising the steps of: detecting a rotating speed of a gas turbine, recording the detected value of the rotating speed of gas turbine, calculating a change with time of the rotating speed of gas turbine in accordance with details of the recorded detected value of the rotating speed of gas turbine, detecting an opening angle of a compressor bleed valve installed in a compressor, and regulating a fuel flow rate fed to the gas turbine combustor on the basis of check results of a calculated value of the change with time of the rotating speed of gas turbine and a detected opening angle signal of the bleed valve respectively controls a fuel flow rate for the diffusion combustion burner to be to the diffusion combustion burner installed in the gas turbine combustor and a fuel flow rate for the premix combustion to be fed to the premix combustion burner so as to switch a combustion state of the gas turbine combustor from independent diffusion combustion by the diffusion combustion burner to mixed combustion of the diffusion combustion and the premix combustion by the diffusion combustion burner and the premix combustion burner.

A method for controlling a gas turbine combustor having a diffusion combustion burner and a premix combustion burner, comprising the steps of: controlling a fuel flow rate for the diffusion combustion burner to be fed to the diffusion combustion burner installed in the gas turbine combustor and a fuel flow rate for the premix combustion to be fed to the premix combustion burner respectively so as to switch a combustion state of the gas turbine combustor from independent diffusion combustion by the diffusion combustion burner to mixed combustion of the diffusion combustion and the premix combustion by the diffusion combustion burner and the premix combustion burner on the basis of a signal transmitted from a timer circuit, which is installed to transmit a signal for controlling the fuel control unit after a predetermined period of time after receipt of a load dump signal of gas turbine, after a predetermined period of time.

According to the present invention, a method and an apparatus for controlling a gas turbine combustor capable of ensuring combustion stability immediately after load dump of the gas turbine and reducing the NOx emission due to full speed no-load operation after the load dump can be realized.

DETAILED DESCRIPTION OF THE INVENTION

Figure 1:
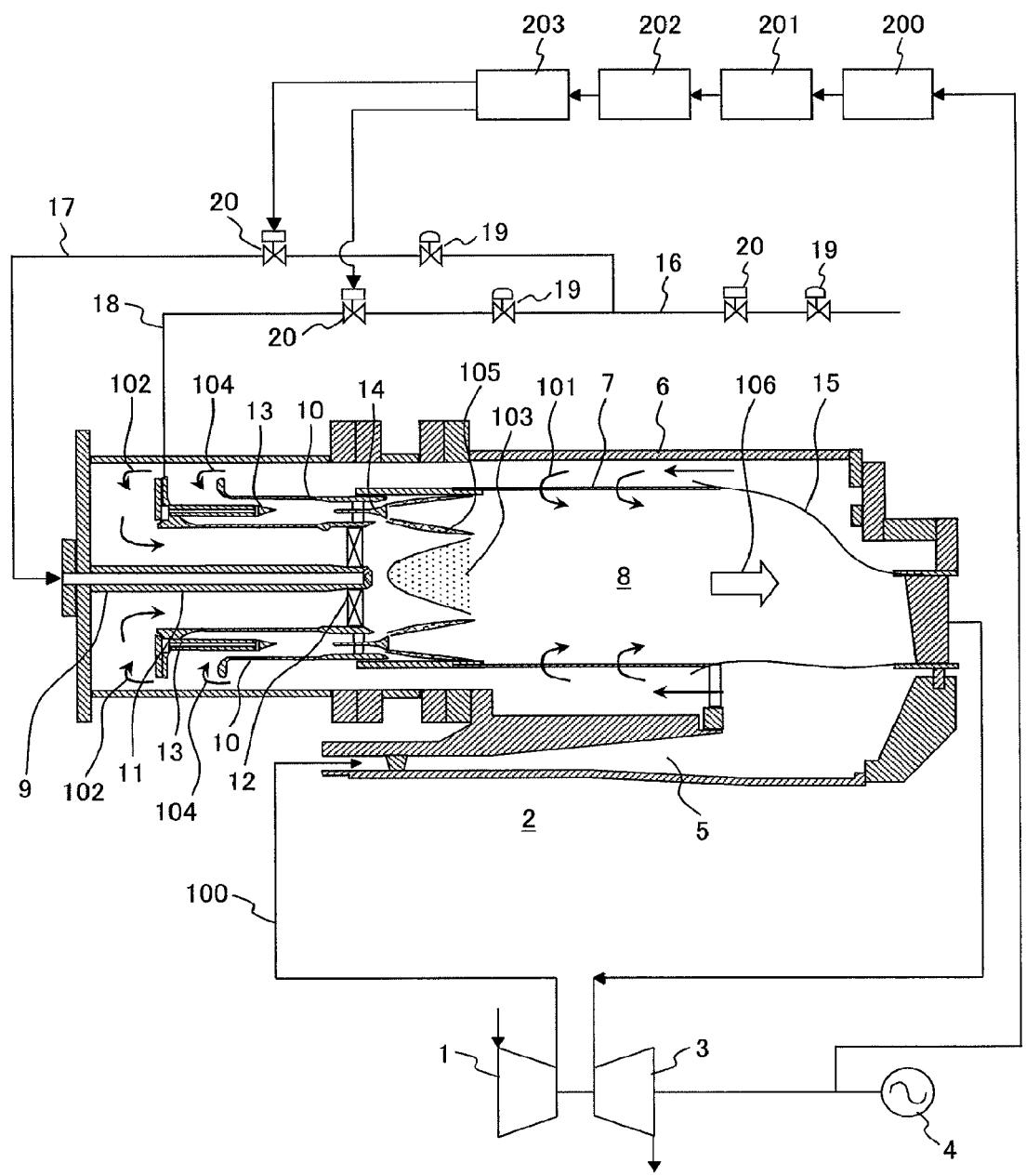
FIG. 1 is a block diagram of the gas turbine unit including the gas turbine combustor that is the first embodiment of the present invention.

A control apparatus for controlling a gas turbine combustor that is an embodiment of the present invention will be explained below with reference to the accompanying drawings.

When using the gas turbine for power generation, the gas turbine needs to withstand the load dump of the gas turbine transferring from the load operation state to the no-load operation state by separating the generator from the gas turbine.

At the time of the load dump of the gas turbine, it is necessary to promptly reduce the fuel flow rate down to the minimum limit at which the gas turbine combustor can maintain the flame and prevent the compressor and gas turbine from damage due to an increase in the rotating speed of the gas turbine up to the limit value or higher.

Due to the increase in the rotating speed of the gas turbine in correspondence to the load dump, the flow rate of compressed air flowing into the gas turbine combustor increases, and the fuel flow rate reduces suddenly, so that the inner state of the gas turbine combustor is greatly changed transiently. Therefore, the gas turbine combustor is required for high combustion stability, so that when reducing the fuel flow rate at the time of the load dump of the gas turbine, fuel is controlled so as to dump the premix fuel and switch to the independent diffusion combustion.

On the other hand, if the combustion of the gas turbine combustor is switched from the premix combustion to the independent diffusion combustion, the NOx emission due to the full speed no-load operation after the load dump increases.

Therefore, the control apparatus of the gas turbine combustor of the present invention includes the detector for detecting the rotating speed of the gas turbine, the recorder for recording a signal of the detector, the arithmetic unit for calculating the change with time of the rotating speed from the information of the recorder, and the fuel control unit, upon receipt of a signal from the arithmetic unit, for controlling the fuel flow rates to be fed to the diffusion combustion burner and premix combustion burner of the gas turbine combustor and is structured so as to output an operation signal to the fuel control unit from the arithmetic unit if the rotating speed of the gas turbine increased from the rated rotating speed due to the load dump of the gas turbine starts to reduce from the increased rotating speed of the gas turbine and control the fuel flow rate fed to the gas turbine combustor so as to switch the independent diffusion combustion to the mixed combustion of the diffusion combustion and premix combustion.

The control apparatus of the gas turbine combustor is structured as mentioned above, thus if the rotating speed of the gas turbine increased from the rated rotating speed after the load dump of the gas turbine starts to reduce, the independent diffusion combustion can be promptly switched to the mixed combustion of the diffusion combustion and premix combustion, so that the NOx emission due to the full speed no-load operation after the load dump can be reduced.

(Embodiment 1)

The control apparatus of the gas turbine combustor and the control method of the gas turbine combustor of the first embodiment of the present invention will be explained by referring to FIGS. 1 to 3.

FIG. 1 shows an entire drawing of the gas turbine unit for power generation having the gas turbine combustor which is the first embodiment of the present invention, and the gas turbine unit includes a compressor 1, a gas turbine combustor 2, and a turbine 3, and by the output of the turbine 3, a generator 4 is rotated, thus power is obtained.

Compressed air 100 compressed by the compressor 1 flows into the gas turbine combustor 2 via a diffuser 5 and passes between an outer sleeve 6 and a combustor liner 7.

A part of the compressed air 100 flows into a combustion chamber 8 of the gas turbine combustor 2 as cooling air 101 of the combustor liner 7. The compressed air 100 not used as cooling air 101 respectively flows into a diffusion combustion burner 9 arranged on the upstream side of the combustor 2 and on the axial center side of the combustor and a premix combustion burner 10 arranged on the outer circumference side of the diffusion combustion burner 9 as combustion air.

The diffusion combustion burner 9 installed in the gas turbine combustor 2 includes a fuel nozzle 11 for the diffusion combustion burner and a swirler 12. The compressed air 100 flowing in the diffusion combustion burner 9 is swirled by the swirler 12 as diffusion combustion air 102, thereby flows into the combustion chamber 8, burns diffusion burner fuel injected from the fuel nozzle 11 for the diffusion combustion burner, and forms a diffusion flame 103 in the combustion chamber 8.

The premix combustion burner 10 installed in the gas turbine combustor 2 respectively includes a plurality of fuel nozzles 13 for the premix burner and a flame stabilizer 14. The compressed air 100 flowing in the premix combustion burner 10 is mixed and burnt with the premix burner fuel injected from the premix burner fuel nozzles 13 as premix combustion air 104 and forms a premix flame 105 in the combustion chamber 8 on the downstream side of the flame stabilizer 14.

High-temperature combustion gas 106 generated by the diffusion flame 103 and the premix flame 105 in the combustion chamber 8 passes through a transition piece 15 installed on the downstream side of the gas turbine combustor 2 and flows into the turbine 3. The combustion gas 106 drives the turbine 3, permits the generator 4 connected to the turbine 3 to rotate, takes out electric power, and then is discharged from the turbine 3 via the exhaust duct.

The fuel fed to the gas turbine combustor 2 is fed through a diffusion combustion burner fuel system 17 and a premix combustion burner fuel system 18 which branch from a fuel main pipe 16. The fuel main pipe 16, the diffusion combustion burner fuel system 17, and the premix combustion burner fuel system 18 respectively include a dump valve 19 and a control valve 20, thus the ratio of the fuel flow fed to the diffusion combustion burner fuel system 17 and the premix combustion burner fuel system 18 can be controlled.

Figure 2:
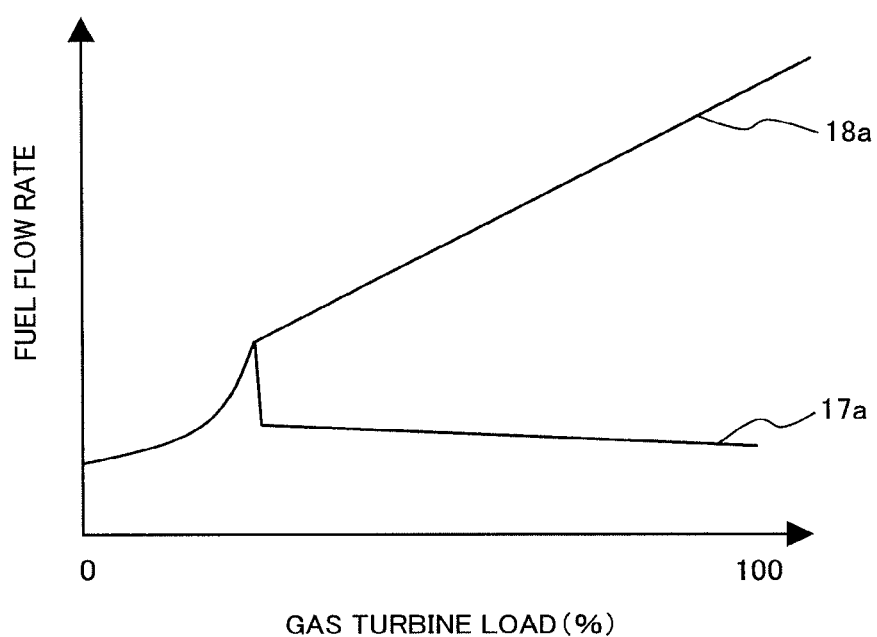
FIG. 2 is a characteristic diagram showing the fuel flow rate of the gas turbine combustor that is the first embodiment of the present invention and the load of the gas turbine.

FIG. 2 shows the relationship between the gas turbine load of the gas turbine combustor 2 of this embodiment and the fuel flow rates of diffusion combustion burner fuel 17a fed to the diffusion combustion burner fuel system 17 and premix combustion burner fuel 18a fed to the premix combustion burner fuel system 18.

As shown in FIG. 2, under the operation condition of a low gas turbine load, the diffusion combustion burner fuel 17a is fed to the diffusion combustion burner fuel system 17, thereby the gas turbine combustor 2 is switched to the independent diffusion combustion, thus the combustion stability is improved. Under the operation condition of a high gas turbine load, the diffusion combustion burner fuel 17a and the premix combustion burner fuel 18a are respectively fed to the diffusion combustion burner fuel system 17 and the premix combustion burner fuel system 18, and the mixed combustion of the diffusion combustion and premix combustion is realized, thus the NOx emission can be reduced.

Figure 3:
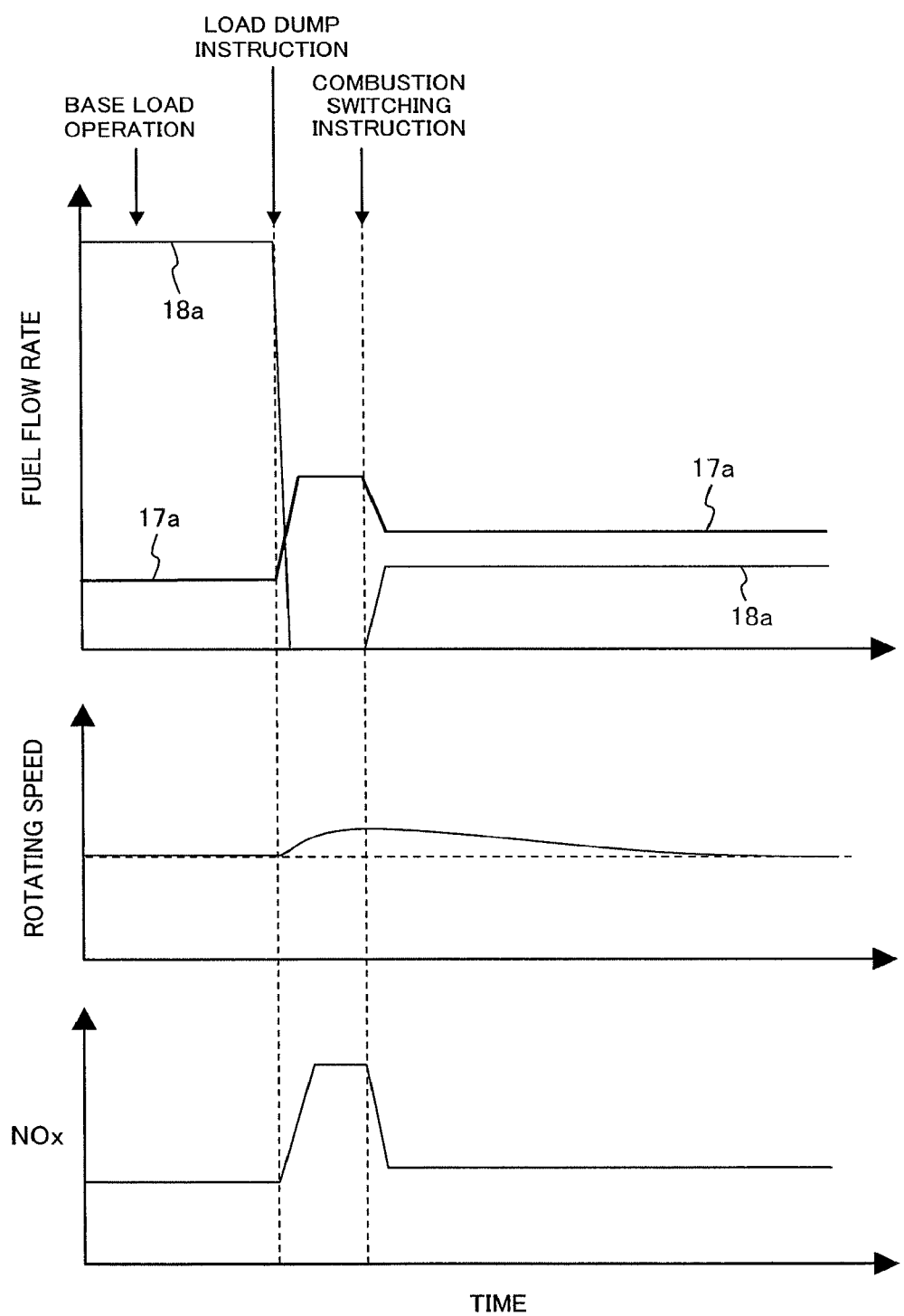
FIG. 3 is a characteristic diagram showing the changes with time of the fuel flow rate of the diffusion combustion burner, the fuel flow rate of the premix combustion burner, the rotating speed of the gas turbine, and the NOx emission at the time of load dump in the first embodiment of the present invention.

FIG. 3 shows the changes with time of the diffusion combustion burner fuel flow rate 17a and the premix combustion burner fuel flow rate 18a which are fed to the diffusion combustion burner fuel system 17 and the premix combustion burner fuel system 18, the rotating speed of the gas turbine, and the NOx emission generated in the gas turbine combustor 2 at the time of the load dump of the gas turbine in the control apparatus of the gas turbine combustor 2 of this embodiment.

As shown in FIG. 3 as a rotating speed of the gas turbine, if the load dump of the gas turbine occurs, the rotating speed of the gas turbine increases. If the rotating speed of the gas turbine increases excessively, there is a possibility that the compressor 1 or the turbine 3 may be damaged, so it is desirable to suppress the rotating speed of the gas turbine to about 110% of the rated speed at its maximum. Therefore, it is necessary to detect a load dump signal of the gas turbine, simultaneously reduce the fuel flow rate fed to the gas turbine combustor 2 down to the minimum limit at which the gas turbine combustor 2 can maintain the flame, and suppress the rotating speed of the gas turbine from increasing.

Therefore, in the control apparatus of the gas turbine combustor 2 of this embodiment, as shown in FIG. 3 as the diffusion combustion burner fuel flow rate 17a and the premix combustion burner fuel flow rate 18a, if the occurrence of the load dump of the gas turbine is detected by the load dump signal of the gas turbine, the feed of the premix combustion burner fuel 18a via the premix combustion burner fuel system 18 for feeding to the gas turbine combustor 2 is dumped and with respect to the fuel, only the feed of the diffusion combustion burner fuel 17a via the diffusion combustion burner fuel system 17 is performed, and the independent diffusion combustion is switched, thus even at the fuel flow rate of the minimum limit, the combustion stability of the gas turbine combustor 2 is ensured. The fuel flow rate fed to the gas turbine combustor 2 is reduced, thus the increased rotating speed of the gas turbine due to the load dump is slowly reduced to the rated rotating speed.

In the control apparatus of the gas turbine combustor 2 of this embodiment, as shown in FIG. 1, the rotating speed of the gas turbine is detected by a rotating speed detector 200 for detecting the rotating speed of the gas turbine, and a detection signal of the rotating speed of the gas turbine which is detected by the rotating speed detector 200 is transmitted to a rotating speed recorder 201, and the information of the rotating speed of the gas turbine is preserved by the rotating speed recorder 201. And, the information of the rotating speed of the gas turbine preserved in the rotating speed recorder 201 is sent to a rotating speed trend arithmetic unit 202 and by the rotating speed trend arithmetic unit 202, the change with time of the rotating speed of the gas turbine is calculated.

The rotating speed trend arithmetic unit 202 detects it by calculating the trend of the change of the rotating speed of the gas turbine on the basis of the value of the rotating speed of the gas turbine recorded in the rotating speed recorder 201 that the rotating speed of the gas turbine increased from the rated rotating speed immediately after the load dump which occurs in the gas turbine starts to reduce from the once-increased rotating speed of the gas turbine, thereby judges the switching of the combustion form of the gas turbine combustor 2.

And, the control apparatus is structured so that when it is detected by the rotating speed trend arithmetic unit 202 that the once-increased rotating speed of the gas turbine starts to reduce, the rotating speed trend arithmetic unit 202 outputs an instruction signal to a fuel control unit 203 for controlling the flow rate of the fuel to be fed to the gas turbine combustor 2 and the combustion form of the gas turbine combustor 2 is switched from the independent diffusion combustion to the mixed combustion of the diffusion combustion and premix combustion by the fuel control unit 203.

When the rotating speed of the gas turbine increased due to the load dump starts to reduce, the reduction of the rotating speed of the gas turbine is detected by the rotating speed trend arithmetic unit 202, and the fuel control unit 203 receiving the instruction signal for switching the combustion form of the gas turbine combustor 2 from the independent diffusion combustion to the mixed combustion of the diffusion combustion and premix combustion from the rotating speed trend arithmetic unit 202, so as to switch the combustion form of the gas turbine combustor 2 from the independent diffusion combustion to the mixed combustion of the diffusion combustion and premix combustion, controls so as to reduce the diffusion combustion burner fuel flow rate 17a which is fed to the diffusion combustion burner 9 of the gas turbine combustor 2 via the diffusion combustion burner fuel system 17 and increase the premix combustion burner fuel flow rate 18a which is fed to the premix combustion burner 10 via the premix combustion burner fuel system 18.

In the state that the rotating speed of the gas turbine increased from the rated rotating speed due to the load dump of the gas turbine starts to reduce from the increased rotating speed of the gas turbine, the transient unstable state due to the load dump is almost settled and even if the combustion form of the gas turbine combustor 2 is switched from the independent diffusion combustion to the mixed combustion of the diffusion combustion and premix combustion, the combustion stability of the gas turbine combustor 2 can be kept.

After the combustion form of the gas turbine combustor 2 is switched to the mixed combustion of the diffusion combustion and premix combustion, the fuel flow rate is regulated and the gas turbine is controlled so as to enter the full speed no-load operation. By executing such fuel control, in the full speed no-load operation state after the load dump of the gas turbine, the NOx emission generated from the gas turbine combustor 2 can be reduced.

Further, in the aforementioned control apparatus of the gas turbine combustor 2 of this embodiment, the reliability of the gas turbine combustor 2 can be improved. Namely, in the diffusion combustion of the gas turbine combustor 2, a flame is formed in a mixing state close to the stoichiometric ratio of fuel to air, so that compared with the premix combustion, a local flame temperature becomes high.

Therefore, when the independent diffusion combustion of the gas turbine combustor 2 is continued in the full speed no-load operation state after the load dump of the gas turbine, there is a possibility that the metal temperature of the diffusion burner 9 of the gas turbine combustor 2 may rise.

Therefore, in the control apparatus of the gas turbine combustor 2 of this embodiment, when the rotating speed of the gas turbine increased from the rated rotating speed after the load dump of the gas turbine starts to reduce, as mentioned above, the combustion form of the gas turbine combustor 2 is promptly switched from the independent diffusion combustion to the mixed combustion of the diffusion combustion and premix combustion, so that a heat load generated by combustion can be diffused to the diffusion combustion burner 9 and the premix combustion burner 10.

As a result, in the control apparatus of the gas turbine combustor 2 of this embodiment, when the rotating speed of the gas turbine increased from the rated rotating speed after the load dump of the gas turbine starts to reduce, the combustion form of the gas turbine combustor 2 is switched from the independent diffusion combustion to the mixed combustion of the diffusion combustion and premix combustion, thus after ignition of the premix combustion burner 10, the metal temperature of the diffusion combustion burner 9 is reduced and even in the full speed no-load operation state, the metal temperature of the diffusion combustion burner 9 can be suppressed low, so that the reliability of the diffusion combustion burner 9 can be improved.

Further, the temperature of the premix combustion burner 10 rises when the combustion form is switched from the independent diffusion combustion to the mixed combustion of the diffusion combustion and premix combustion, though the premix combustion burner fuel flow rate 18a fed to the premix combustion burner 10 via the premix combustion burner fuel system 18 is sufficiently low compared with the rated load condition, so that the metal temperature of the premix combustion burner 10 is low and the gas turbine combustor 2 creates no trouble in reliability.

According to this embodiment, a method and an apparatus for controlling a gas turbine combustor capable of ensuring combustion stability immediately after the load dump of the gas turbine and reducing the NOx emission due to the full speed no-load operation after the load dump can be realized.

(Embodiment 2)

Next, the control apparatus of the gas turbine combustor and the control method of the gas turbine combustor of the second embodiment of the present invention will be explained by referring to FIGS. 4 and 5. The control apparatus of the gas turbine combustor 2 of the second embodiment of the present invention is the same as that of the gas turbine combustor 2 of the first embodiment shown in FIGS. 1 to 3 in the basic constitution, so that the explanation common to the two is omitted and only the different portions will be explained below.

Figure 4:
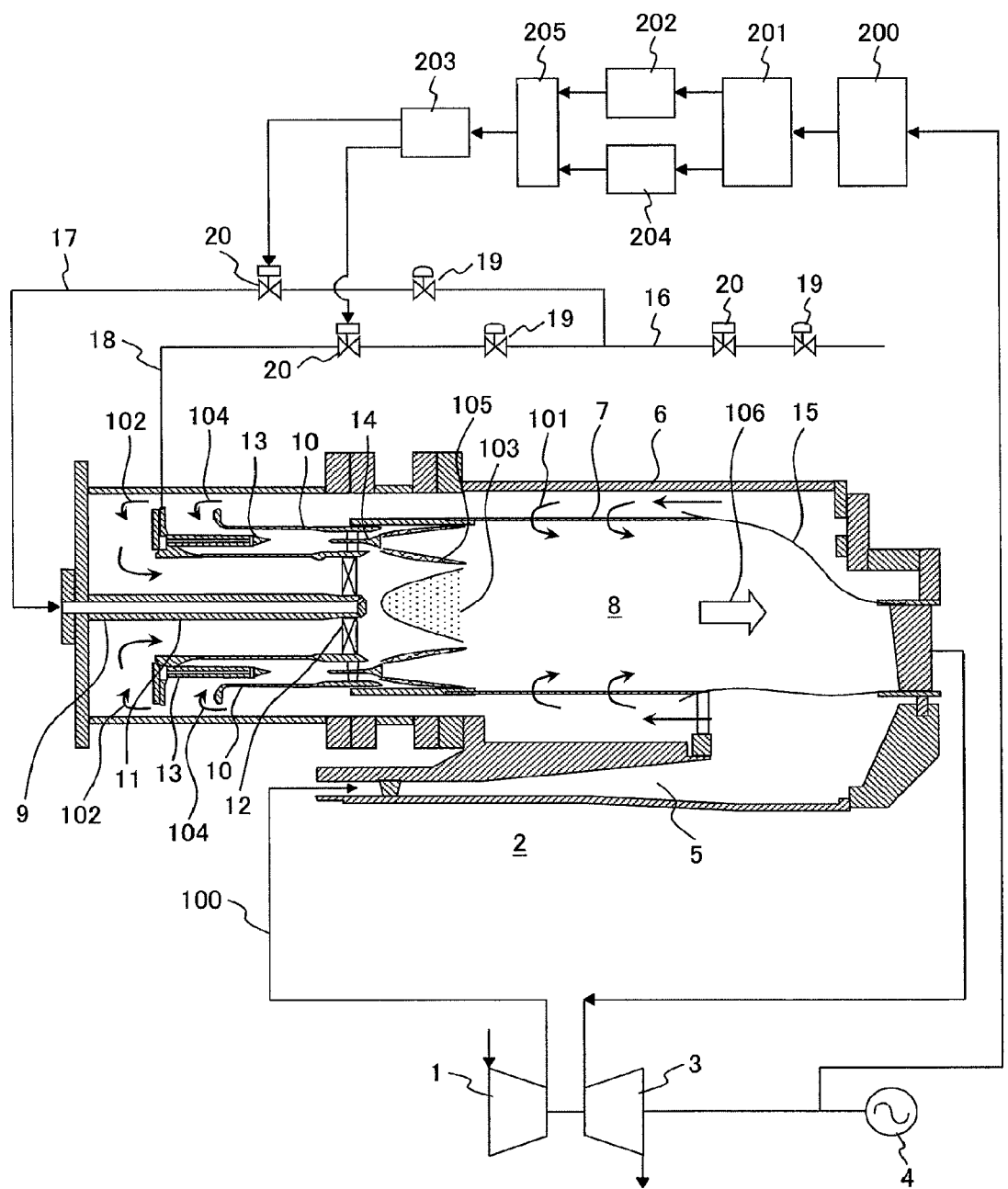
FIG. 4 is a block diagram of the gas turbine unit including the gas turbine combustor that is the second embodiment of the present invention.

FIG. 4 shows an entire drawing of the gas turbine unit for power generation including the gas turbine combustor 2 which is the second embodiment of the present invention and the control apparatus of the gas turbine combustor 2 of this embodiment, in addition to the constitution of the gas turbine combustor 2 of the first embodiment, is structured so as to install a rotating speed comparison arithmetic unit 204 for comparing a set switching rotating speed with information of the recorder 201 for recording the rotating speed of the gas turbine and a logic circuit 205 for deciding signals of the rotating speed trend arithmetic unit 202 and the rotating speed comparison arithmetic unit 204.

In the fuel control method by the control apparatus of the gas turbine combustor 2 of the first embodiment, when the rising width of the rotating speed at the time of the load dump of the gas turbine is wide, under the condition that the rotating speed of the gas turbine is high and the air flow rates of the compressed air 100 and the premix combustion air 104 which flow into the gas turbine combustor 2 are high, the combustion form of the gas turbine combustor 2 is switched from the independent diffusion combustion to the mixed combustion of the diffusion combustion and premix combustion. Therefore, at the time of ignition of the premix flame 105 formed in the combustion chamber 8 of the gas turbine combustor 2, the premix flame 105 becomes unstable transiently and there is a possibility of flame loss.

Therefore, the control apparatus of the gas turbine combustor 2 of this embodiment is structured so as to install the rotating speed comparison arithmetic unit 204 for comparing the switching rotating speed for switching the combustion form from the independent diffusion combustion to the mixed combustion of the diffusion combustion and premix combustion with the information of the rotating speed of the gas turbine recorded in the recorder 201 and the logic circuit 205 for deciding signals of the rotating speed trend arithmetic unit 202 and the rotating speed comparison arithmetic unit 204.

Figure 5:
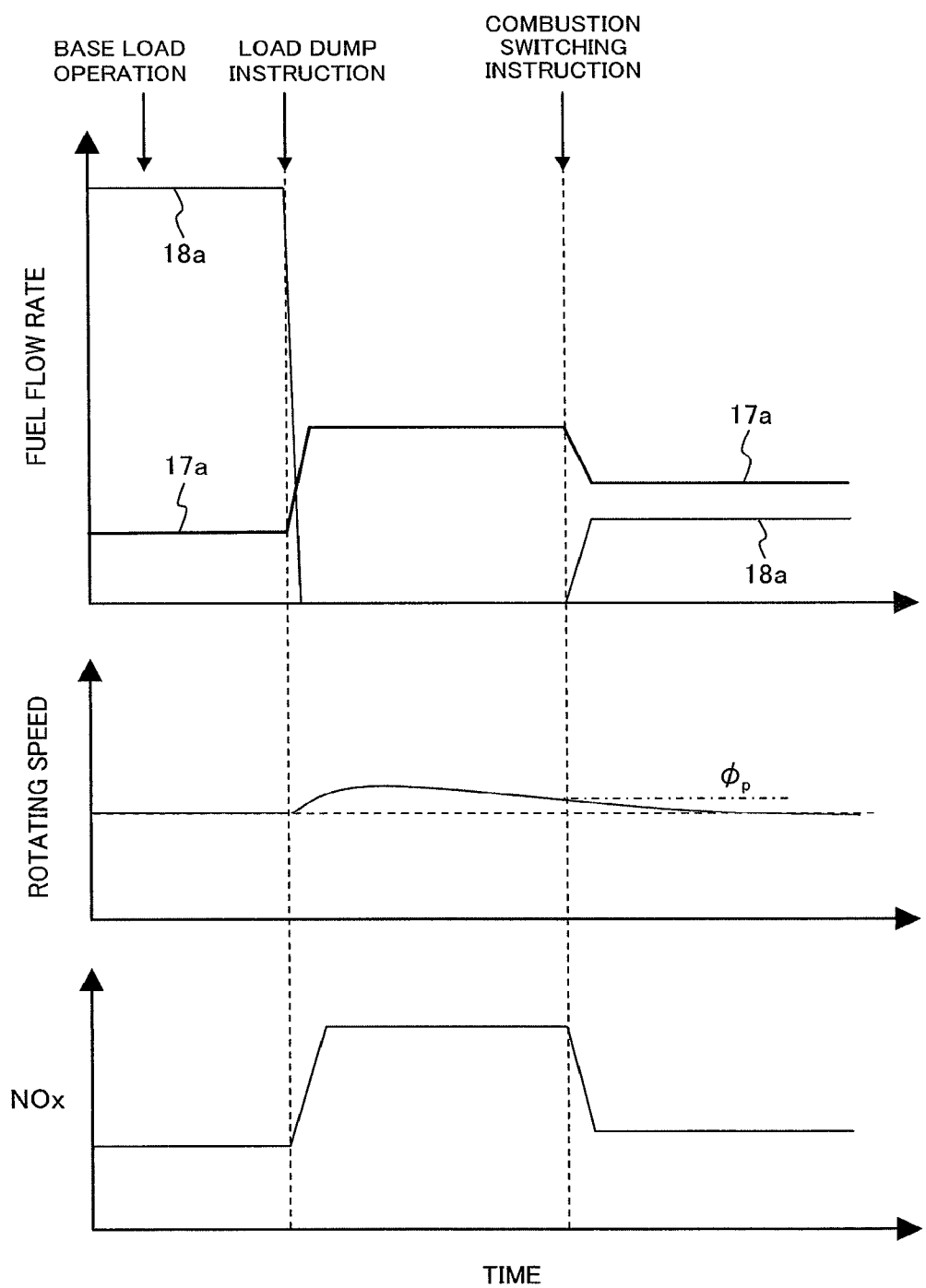
FIG. 5 is a characteristic diagram showing the changes with time of the fuel flow rate of the diffusion combustion burner, the fuel flow rate of the premix combustion burner, the rotating speed of the gas turbine, and the NOx emission at the time of load dump in the second embodiment of the present invention.

FIG. 5 shows the changes with time of the diffusion combustion burner fuel flow rate 17a and the premix combustion burner fuel flow rate 18a which are fed to the diffusion combustion burner fuel system 17 and the premix combustion burner fuel system 18, the rotating speed of the gas turbine, and the NOx emission generated in the gas turbine combustor 2 at the time of load dump of the gas turbine in the control apparatus of the gas turbine combustor 2 of this embodiment.

In FIG. 5, in the control apparatus of the gas turbine combustor 2 of this embodiment, the rotating speed comparison arithmetic unit 204 compares a preset switching rotating speed $\phi_p$ with the information of the rotating speed of the recorder 201 and when the rotating speed of the gas turbine increased after the load dump reduces to the switching rotating speed $\phi_p$ or lower, transmits a signal to the logic circuit 205.

The switching rotating speed $\phi_p$ is within the range from the rated rotating speed to 110% of the rated rotating speed and it is desirable to set the rotating speed of the gas turbine so that even if the combustion form of the gas turbine combustor 2 is switched from the independent diffusion combustion to the mixed combustion of the diffusion combustion and premix combustion, the premix flame 105 formed in the combustion chamber 8 of the gas turbine combustor 2 burns stably.

The logic circuit 205 decides the signals output from the rotating speed trend arithmetic unit 202 and the rotating speed comparison arithmetic unit 204 and only upon receipt of both of an output signal from the rotating speed trend arithmetic unit 202 when the rotating speed of the gas turbine which is increased once due to the load dump starts to reduce and a signal of the rotating speed of the gas turbine of the switching rotating speed $\phi_p$ or lower output from the rotating speed comparison arithmetic unit 204, transmits an operation signal from the logic circuit 205 to the fuel control unit 203.

The fuel control unit 203 receives the operation signal from the logic circuit 205 and so the combustion form of the gas turbine combustor 2 is switched from the independent diffusion combustion to the mixed combustion of the diffusion combustion and premix combustion, controls so as to reduce the diffusion combustion burner fuel flow rate 17a which is fed via the diffusion combustion burner fuel system 17 and increase the premix combustion burner fuel flow rate 18a which is fed via the premix combustion burner fuel system 18.

The control apparatus of the gas turbine combustor 2 of this embodiment is structured as mentioned above, thus when the rising width of the rotating speed of the gas turbine at the time of the load dump of the gas turbine is wide, after the rotating speed of the gas turbine reduces down to the switching rotating speed $\phi_p$, the combustion form of the gas turbine combustor 2 is switched from the independent diffusion combustion to the mixed combustion of the diffusion combustion and premix combustion, so that the premix flame 105 formed in the combustion chamber 8 of the gas turbine combustor 2 can be ignited stably and can be prevented from flame loss.

According to this embodiment, a method and an apparatus for controlling a gas turbine combustor capable of ensuring combustion stability immediately after the load dump of the gas turbine and reducing the NOx emission due to the full speed no-load operation after the load dump can be realized.

(Embodiment 3)

Next, the control apparatus of the gas turbine combustor and the control method of the gas turbine combustor of the third embodiment of the present invention will be explained by referring to FIGS. 6 and 7. The control apparatus of the gas turbine combustor 2 of the third embodiment of the present invention is the same as that of the gas turbine combustor 2 of the first embodiment shown in FIGS. 1 to 3 in the basic constitution, so that the explanation common to the two is omitted and only the different portions will be explained below.

Figure 6:
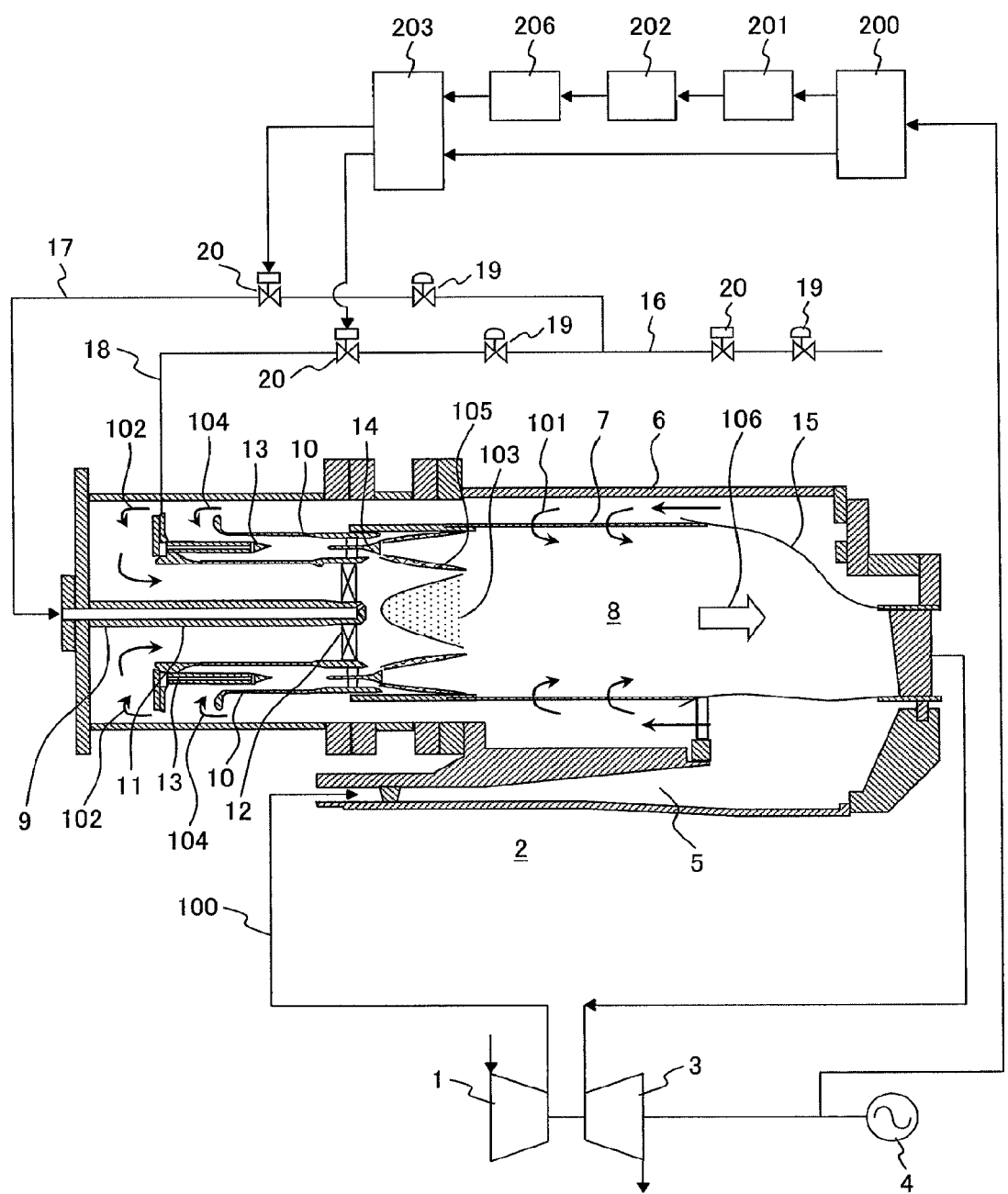
FIG. 6 is a block diagram of the gas turbine unit including the gas turbine combustor that is the third embodiment of the present invention.

FIG. 6 shows an entire drawing of the gas turbine unit for power generation including the gas turbine combustor 2 which is the third embodiment of the present invention and the gas turbine combustor 2 of this embodiment, in addition to the constitution of the gas turbine combustor 2 of the first embodiment, is structured so as to install a switching rotating speed arithmetic unit 206 for calculating the rotating speed of the gas turbine to switch the combustion form of the gas turbine combustor 2 from the independent diffusion combustion to the mixed combustion of the diffusion combustion and premix combustion from the information of the recorder 201 for recording the rotating speed of the gas turbine after the load dump of the gas turbine.

Figure 7:
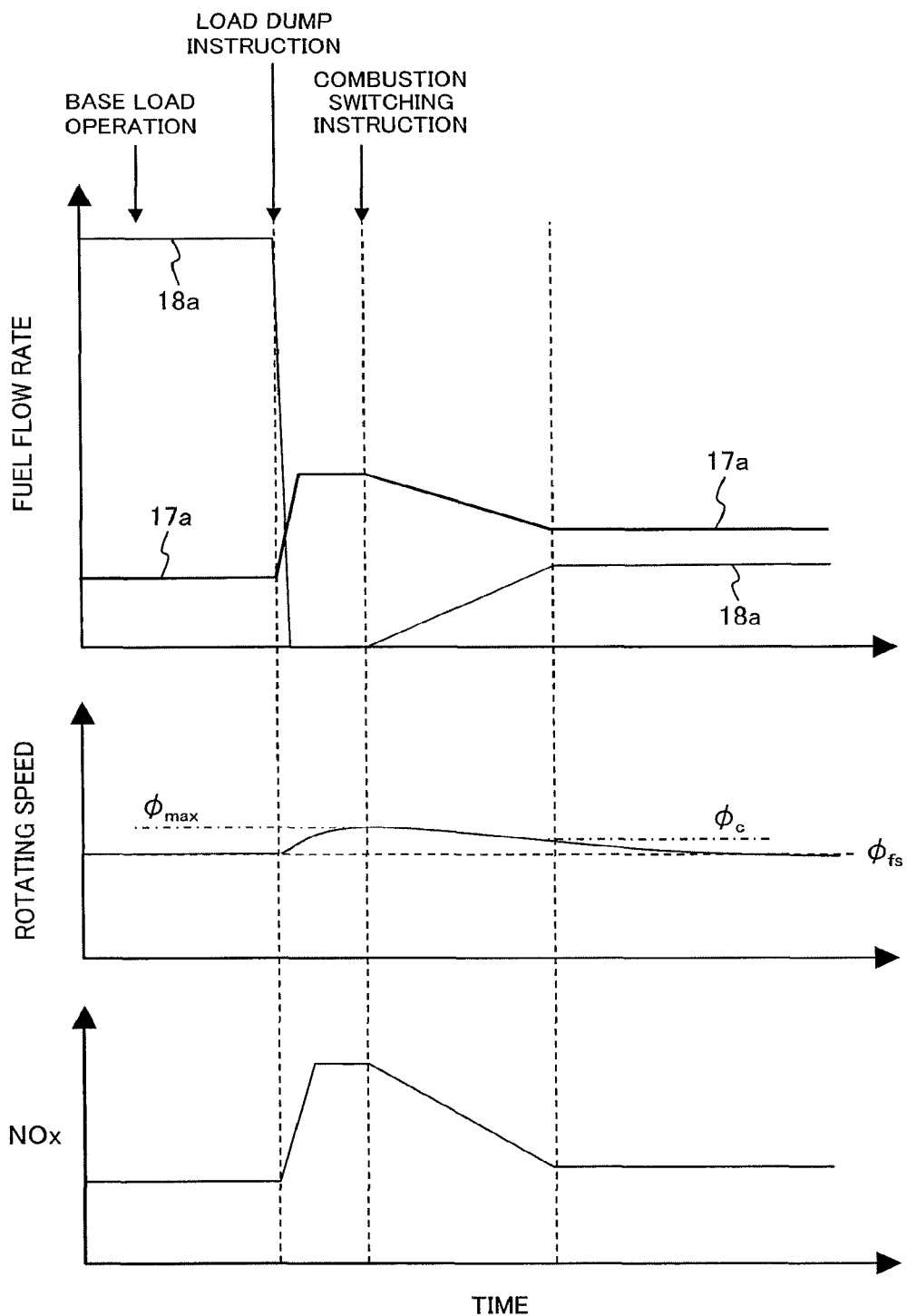
FIG. 7 is a characteristic diagram showing the changes with time of the fuel flow rate of the diffusion combustion burner, the fuel flow rate of the premix combustion burner, the rotating speed of the gas turbine, and the NOx emission at the time of load dump in the third embodiment of the present invention.

FIG. 7 shows the changes with time of the diffusion combustion burner fuel flow rate 17a and the premix combustion burner fuel flow rate 18a which are fed via the diffusion combustion burner fuel system 17 and the premix combustion burner fuel system 18 at the time of load dump of the gas turbine in the control apparatus of the gas turbine combustor 2 of this embodiment, the rotating speed of the gas turbine, and the NOx emission generated in the gas turbine combustor 2.

As shown in FIG. 7, in the control apparatus of the gas turbine combustor 2 of this embodiment, the rotating speed of the gas turbine increased from the rated rotating speed in correspondence to the load dump of the gas turbine, if the fuel flow rate fed to the gas turbine combustor 2 reduces, starts to reduce.

Therefore, in the control apparatus of the gas turbine combustor 2 of this embodiment, if it is detected by the rotating speed trend arithmetic unit 202 that the rotating speed of the gas turbine increased immediately after the load dump of the gas turbine starts to reduce from the rated rotating speed, a signal is transmitted from the rotating speed trend arithmetic unit 202 to the switching rotating speed arithmetic unit 206.

The switching rotating speed arithmetic unit 206 receiving the signal of detecting that the rotating speed of the gas turbine starts to reduce from the rotating speed trend arithmetic unit 202, by a built-in arithmetic unit, from the maximum rotating speed $\phi_{max}$ of the gas turbine recorded in the rotating speed recorder 201, on the basis of Formulas (1) and (2) indicated below, calculates a fuel control switching rotating speed $\phi_c$.

By the calculator built in the switching rotating speed arithmetic unit 206, the fuel control switching rotating speed $\phi_c$ is calculated by Formula (1) indicated below.

$$\phi_c = \phi_{fs} + \alpha \times (\phi_{max} - \phi_{fs}) \tag{1}$$

In Formula (1), $\phi_{max}$ indicates a maximum rotating speed after the load dump and $\phi_{fs}$ indicates a rated rotating speed. $\alpha$ indicates a constant and it is a value within the range indicated in Formula (2).

$$0 \leq \alpha < 1 \tag{2}$$

The switching rotating speed arithmetic unit 206 transmits the fuel control switching rotating speed $\phi_c$ calculated by the built-in calculator on the basis of Formulas (1) and (2) to the fuel control unit 203 as information of the switching rotating speed $\phi_c$.

The fuel control unit 203 receiving the information from the switching rotating speed arithmetic unit 206, in the switching rotating speed $\phi_c$, so that the switching of the combustion form of the gas turbine combustor 2 from the independent diffusion combustion to the mixed combustion of the diffusion combustion and premix combustion is completed, as shown in FIG. 7, in accordance with the reduction in the rotating speed of the gas turbine, controls so as to reduce the diffusion combustion burner fuel flow rate 17a which is fed via the diffusion combustion burner fuel system 17 of the gas turbine combustor 2 and increase the premix combustion burner fuel flow rate 18a which is fed via the premix combustion burner fuel system 18 of the gas turbine combustor 2.

In the control apparatus of the gas turbine combustor 2 of this embodiment, a fuel flow ratio $F_d$ of the diffusion combustion burner fuel fed to the diffusion combustion burner fuel system 17 and a fuel flow ratio $F_p$ of the diffusion combustion burner fuel fed to the premix combustion burner fuel system 18, using the maximum rotating speed $\phi_{max}$, the fuel control switching rotating speed $\phi_c$, the rotating speed $\phi$ detected by the rotating speed detector 200, and a fuel flow ratio $F_{d1}$ of the diffusion combustion burner fuel after switching, are calculated from Formulas (3), (4), and (5) indicated below.

Fuel flow ratio of diffusion combustion burner fuel:

$$F_d \, (\%) \, (\phi_c < \phi \leq \phi_{max})$$

$$F_d = (\phi - \phi_c)/(\phi_{max} - \phi_c) \times (100 - F_{d1}) + F_{d1} \tag{3}$$

Fuel flow ratio of diffusion combustion burner fuel:

$$F_d \, (\%) \, (\phi_{fs} \leq \phi \leq \phi_c)$$

$$F_d = F_{d1} \tag{4}$$

Fuel flow ratio of premix combustion burner fuel: $F_p$ (%)

$$F_p = 100 - F_d \tag{5}$$

Figure 8:
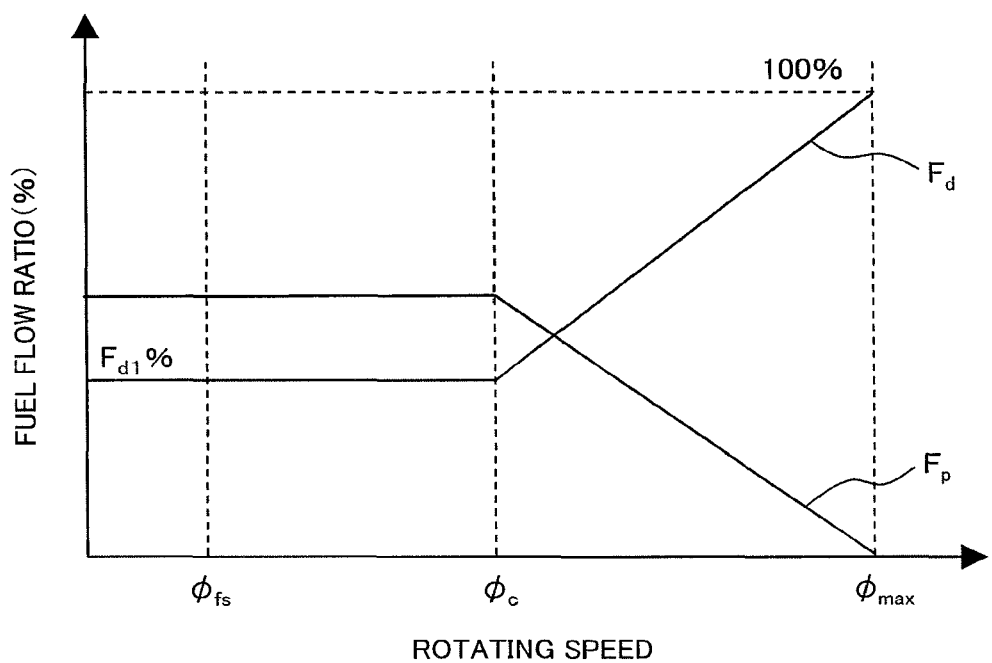
FIG. 8 is a characteristic diagram showing the relationship between the rotating speed of the gas turbine and the fuel flow ratio at the time of load dump in the third embodiment of the present invention.

The relationship of the rotating speed of the gas turbine to the fuel flow ratios of the diffusion combustion burner fuel and premix combustion burner fuel is shown in FIG. 8.

The control apparatus of the gas turbine combustor 2 of this embodiment is structured as mentioned above, thus the reliability when switching the combustion form of the gas turbine combustor 2 from the independent diffusion combustion to the mixed combustion of the diffusion combustion and premix combustion can be improved.

When switching the combustion form of the gas turbine combustor 2, if the operation of closing the control valve 20 of the diffusion combustion burner fuel system 17 for feeding the diffusion combustion burner fuel to the diffusion combustion burner 9 is faster than the operation of opening the control valve 20 of the premix combustion burner fuel system 18 for feeding the premix combustion burner fuel to the premix burner 10 of the gas turbine combustor 2, for the flow rate of the compressed air 100 for the rotating speed of the gas turbine, the premix combustion ratio is increased transiently, and the premix flame 105 formed in the combustion chamber 8 of the gas turbine combustor 2 becomes unstable, and there is a possibility of flame loss.

Therefore, the control apparatus of the gas turbine combustor 2 of this embodiment, by use of the aforementioned constitution, in accordance with the rotating speed of the gas turbine, switches the combustion form of the gas turbine combustor 2 from the independent diffusion combustion to the mixed combustion of the diffusion combustion and premix combustion, so that when the rotating speed of the gas turbine is high, the diffusion combustion ratio of high stability increases, and the flame stability is ensured, and when the rotating speed of the gas turbine reduces, the premix combustion ratio increases, thus the NOx emission generated by the gas turbine combustor 2 can be reduced.

According to this embodiment, a method and an apparatus for controlling a gas turbine combustor capable of ensuring combustion stability immediately after the load dump of the gas turbine and reducing the NOx emission due to the full speed no-load operation after the load dump can be realized.

(Embodiment 4)

Next, the control apparatus of the gas turbine combustor and the control method of the gas turbine combustor of the fourth embodiment of the present invention will be explained by referring to FIGS. 9 and 10. The control apparatus of the gas turbine combustor 2 of the fourth embodiment of the present invention is the same as that of the gas turbine combustor 2 of the first embodiment shown in FIGS. 1 to 3 in the basic constitution, so that the explanation common to the two is omitted and only the different portions will be explained below.

Figure 9:
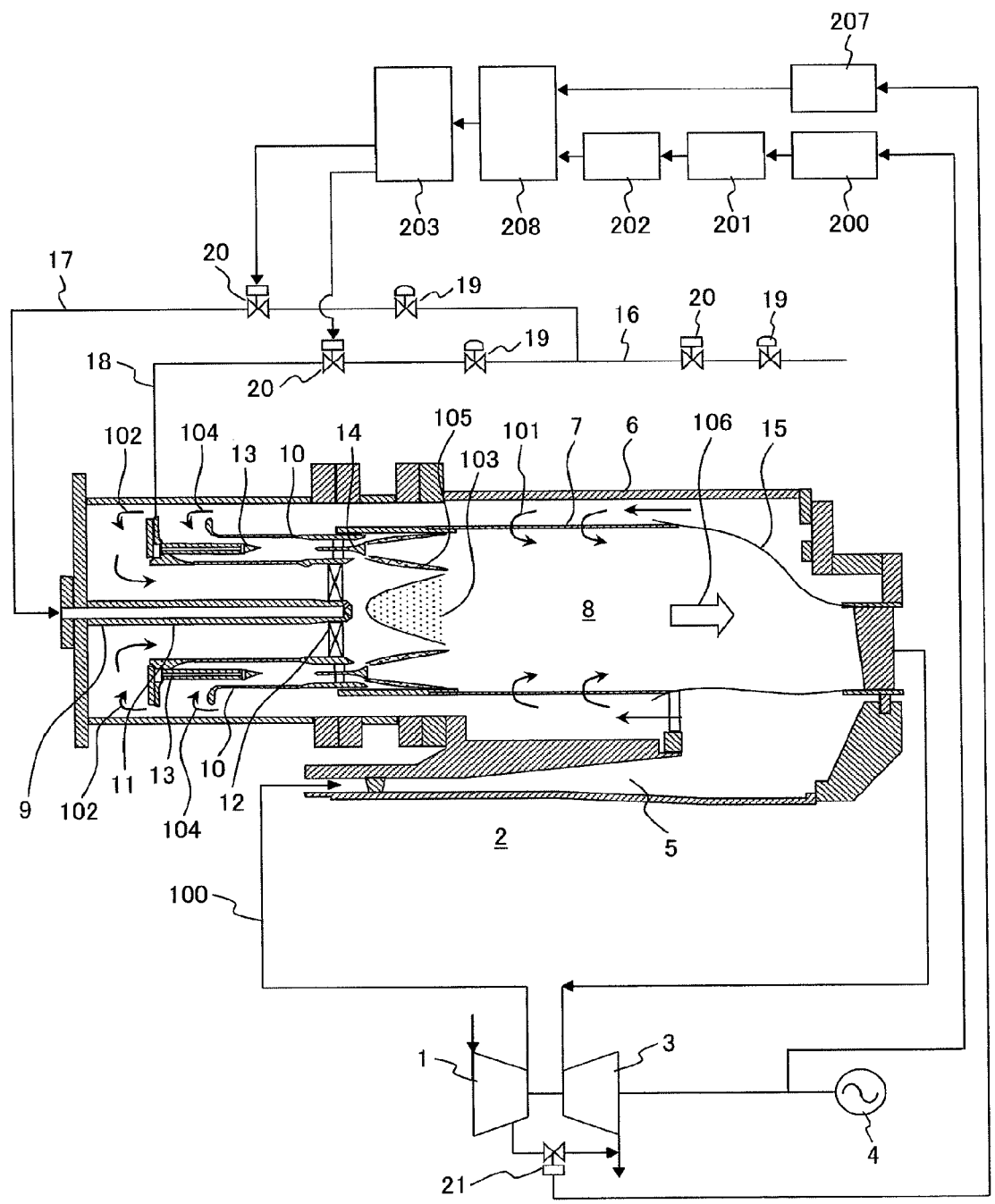
FIG. 9 is a block diagram of the gas turbine unit including the gas turbine combustor that is the fourth embodiment of the present invention.
Figure 10:
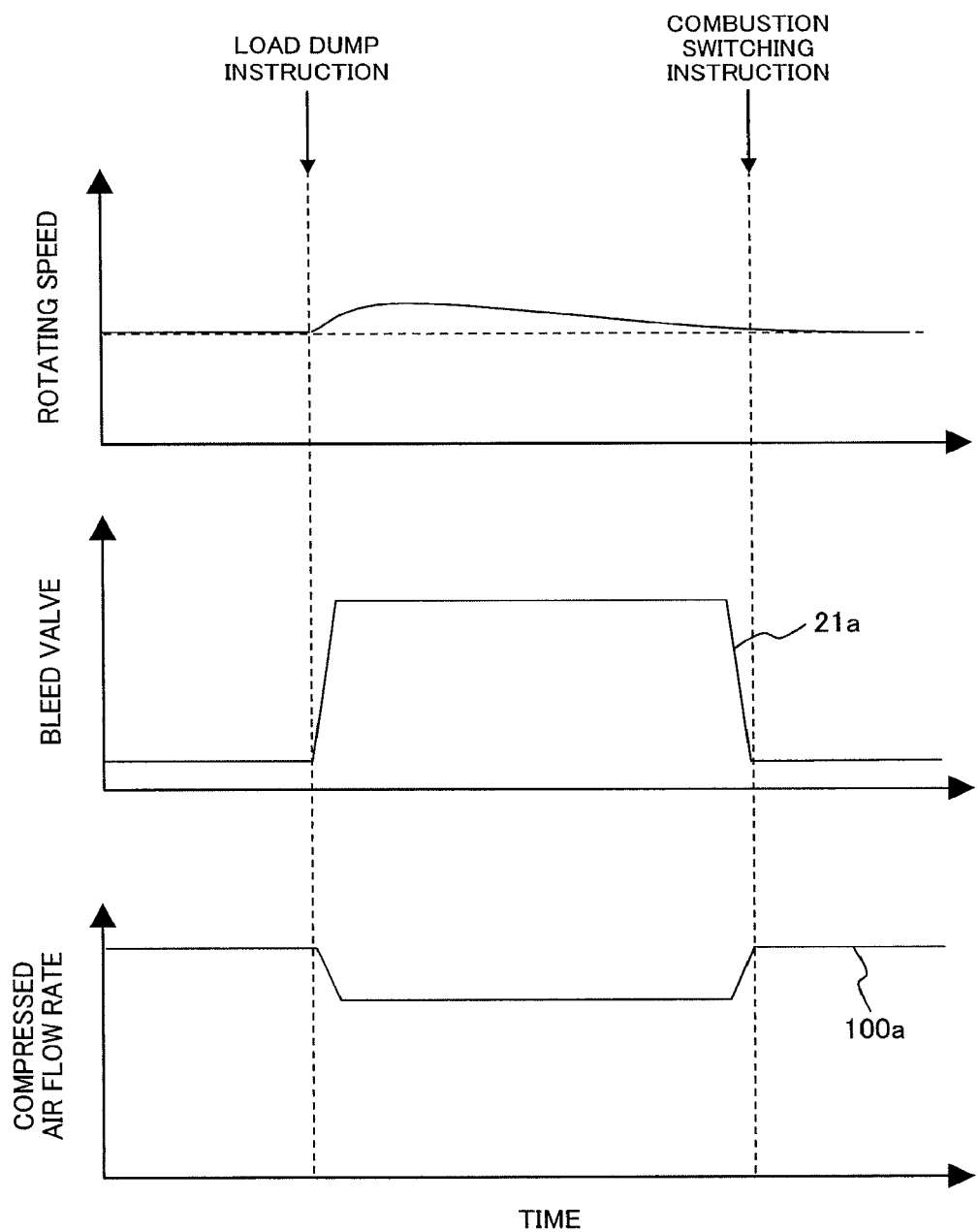
FIG. 10 is a characteristic diagram showing the rotating speed of the gas turbine, the opening angle of the bleed valve, and the flow rate of compressed air at the time of load dump in the fourth embodiment of the present invention.

FIG. 9 shows an entire drawing of the gas turbine unit for power generation including the gas turbine combustor 2 which is the fourth embodiment of the present invention and the gas turbine combustor 2 of this embodiment, in addition to the constitution of the gas turbine combustor 2 of the first embodiment, is structured so as to install a bleed valve on-off detector 207 for detecting opening or closing of a bleed valve 21 installed in the compressor 1 and a logic circuit 208 for deciding bleed valve on-off signals detected respectively by the bleed valve on-off detector 207 and the rotating speed detector 200 of the gas turbine and a detection signal of the rotating speed of the gas turbine.

The bleed valve 21 installed in the compressor 1 is installed in the middle of the flow path for connecting the intermediate stage of the compressor 1 and the exhaust duct, and the bleed valve 21 is opened, and a part of the compressed air 100 compressed by the compressor 1 is permitted to escape into the exhaust duct, thus in the start-up and acceleration processes of the gas turbine, the compressor 1 is prevented from surging.

The operation of the bleed valve 21, in the start-up and acceleration processes of the gas turbine, totally opens the bleed valve 21 and when the rotating speed of the gas turbine is at a fixed value or higher, totally closes the bleed valve 21. If the bleed valve 21 is totally closed, the flow rate of the compressed air 100 flowing into the gas turbine combustor 2 increases.

Next, the operation of the bleed valve 21 at the time of load dump of the gas turbine will be explained by referring to FIG. 10. As the rotating speed of the gas turbine, an opening angle 21a of the bleed valve 21, and a compressed air flow rate 100a of the compressor 1 are respectively shown in FIG. 10, at the time of load dump of the gas turbine, the flow rate of the compressed air 100 flowing into the turbine 3 is reduced and the increase in the rotating speed of the gas turbine is suppressed, so that the opening angle 21a of the bleed valve 21 is controlled so as to be totally opened simultaneously with the load dump.

Thereafter, if the rotating speed of the gas turbine starts to reduce, the opening angle 21a of the bleed valve 21 is operated so as to be totally closed. At this time, in accordance with the totally closing operation of the opening angle 21a of the bleed valve 21, the flow rate 100a of the compressed air 100 flowing into the gas turbine combustor 2 increases, so that when the combustion form of the gas turbine combustor 2 is the mixed combustion of the diffusion combustion and premix combustion, on the downstream side of the premix combustion burner 10, the mixing ratio of fuel and air is lowered, and the premix flame 105 formed in the combustion chamber 8 of the gas turbine combustor 2 becomes unstable, and there is a possibility of flame loss.

Therefore, until the totally closing operation of the opening angle 21a of the bleed valve 21 is finished, it is desirable that the gas turbine combustor 2 is kept in the independent diffusion combustion state of high stability.

Therefore, the control apparatus of the gas turbine combustor 2 of this embodiment shown in FIG. 9, from the bleed valve on-off detector 207, the gas turbine rotating speed detector 200, and the information of the rotating speed of the gas turbine preserved in the recorder 201 for preserving the information of the rotating speed of the gas turbine, calculates the change with time of the rotating speed of the gas turbine by the rotating speed trend arithmetic unit 202 and checks, by the logic circuit 8, an on-off signal of the bleed valve 21 detected by the bleed valve on-off detector 207 and a change with time signal of the rotating speed of the gas turbine calculated by the rotating speed trend arithmetic unit 202.

The logic circuit 208, when the condition that the bleed valve 21 is totally closed after the load dump of the gas turbine and the rotating speed of the gas turbine starts to reduce is effected, outputs an instruction signal to the fuel control unit 201.

The fuel control unit 201, upon receipt of the instruction signal from the logic circuit 208, so that the combustion form of the gas turbine combustor 2 is switched from the independent diffusion combustion to the mixed combustion of the diffusion combustion and premix combustion, controls so as to reduce the diffusion combustion burner fuel flow rate 17a which is fed to the diffusion combustion burner 9 of the gas turbine combustor 2 via the diffusion combustion burner fuel system 17 and increase the premix combustion burner fuel flow rate 18a which is fed to the premix combustion burner 10 via the premix combustion burner fuel system 18.

The control apparatus of the gas turbine combustor 2 of this embodiment is structured as mentioned above, thus after completion of the totally closing operation of the bleed valve 21 installed in the compressor 1, the combustion form of the gas turbine combustor 2 can be switched to the mixed combustion of the diffusion combustion and premix combustion. Therefore, by the totally closing operation of the bleed valve 21, the premix flame 105 formed in the combustion chamber 8 of the gas turbine combustor 2 can be prevented from becoming unstable and losing the flame.

According to this embodiment, a method and an apparatus for controlling a gas turbine combustor capable of ensuring combustion stability immediately after the load dump of the gas turbine and reducing the NOx emission due to the full speed no-load operation after the load dump can be realized.

(Embodiment 5)

Next, the control apparatus of the gas turbine combustor and the control method of the gas turbine combustor of the fifth embodiment of the present invention will be explained by referring to FIG. 11. The control apparatus of the gas turbine combustor 2 of the fifth embodiment of the present invention is the same as that of the gas turbine combustor 2 of the first embodiment shown in FIGS. 1 to 3 in the basic constitution, so that the explanation common to the two is omitted and only the different portions will be explained below.

Figure 11:
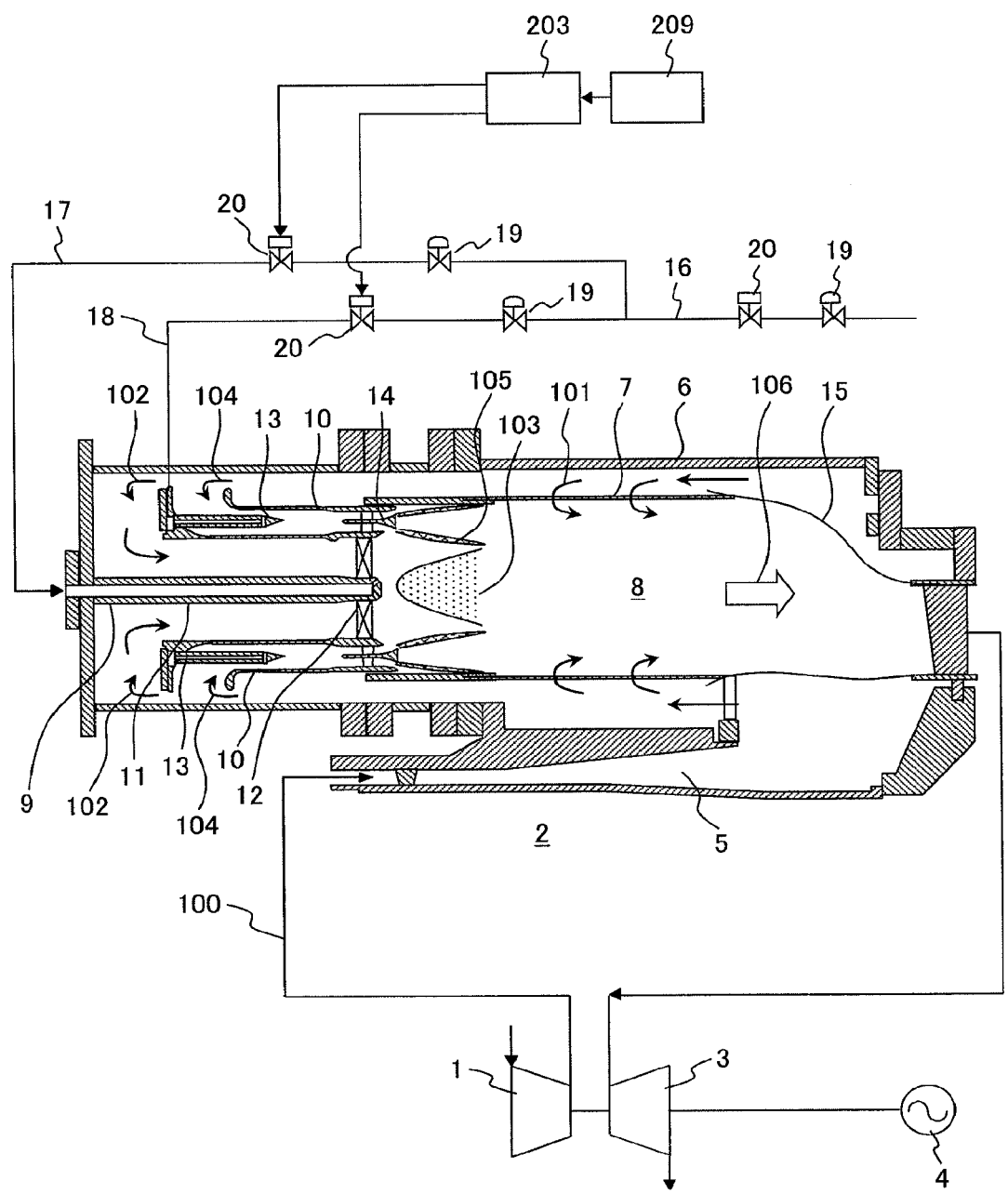
FIG. 11 is a block diagram of the gas turbine unit including the gas turbine combustor that is the fifth embodiment of the present invention.

FIG. 11 shows an entire drawing of the gas turbine including the gas turbine combustor of the fifth embodiment of the present invention and the control apparatus of the gas turbine combustor 2 of this embodiment is structured so as to install, in place of the rotating speed detector 200 of the gas turbine installed in the gas turbine combustor 2 of the first embodiment, a timer circuit 209 for transmitting a signal to the fuel control unit 203 after a predetermined period of time from the load dump of the gas turbine.

According to the control apparatus of the gas turbine combustor 2 of this embodiment, the timer circuit 209 receiving the load dump signal of the gas turbine transmits a signal to the fuel control unit 203 after the predetermined period of time from the load dump.

Namely, the timer circuit 209 is structured so as to preset the time required for the rotating speed of the gas turbine to increase once due to the load dump of the gas turbine to reduce on a level free of trouble even if the combustion form of the gas turbine combustor 2 is switched from the independent diffusion combustion to the mixed combustion of the diffusion combustion and premix combustion and output a signal after the preset time elapses from the load dump.

And, the fuel control unit 203 receiving the output signal from the timer circuit 209, so that the combustion form of the gas turbine combustor 2 is switched from the independent diffusion combustion to the mixed combustion of the diffusion combustion and premix combustion, controls so as to reduce the diffusion combustion burner fuel flow rate 17a which is fed to the diffusion combustion burner 9 of the gas turbine combustor 2 via the diffusion combustion burner fuel system 17 and increase the premix combustion burner fuel flow rate 18a which is fed to the premix combustion burner 10 via the premix combustion burner fuel system 18.

The signal delay time set in the timer circuit 209 should preferably be a sufficient period of time for the rotating speed of the gas turbine increased from the rated rotating speed due to the load dump of the gas turbine to reduce again down to the rated rotating speed and a short period of time as possible to reduce the NOx emission in the independent diffusion combustion of the gas turbine combustor 2 and concretely, should preferably be about 30 seconds.

The control apparatus of the gas turbine combustor 2 of this embodiment is structured as mentioned above, thus a similar effect to that of the gas turbine combustor 2 of Embodiment 1 can be reproduced by the simple timer circuit 209, and the control logic is simplified, thus the cost of the control apparatus can be decreased.

According to this embodiment, a method and an apparatus for controlling a gas turbine combustor capable of ensuring combustion stability immediately after the load dump of the gas turbine and reducing the NOx emission due to the full speed no-load operation after the load dump can be realized.

(Embodiment 6)

Next, the control apparatus of the gas turbine combustor and the control method of the gas turbine combustor of the sixth embodiment of the present invention will be explained by referring to FIGS. 12 and 13. The control apparatus of the gas turbine combustor 2 of the sixth embodiment of the present invention is the same as that of the gas turbine combustor 2 of the first embodiment shown in FIGS. 1 to 3 in the basic constitution, so that the explanation common to the two is omitted and only the different portions will be explained below.

Figure 12:
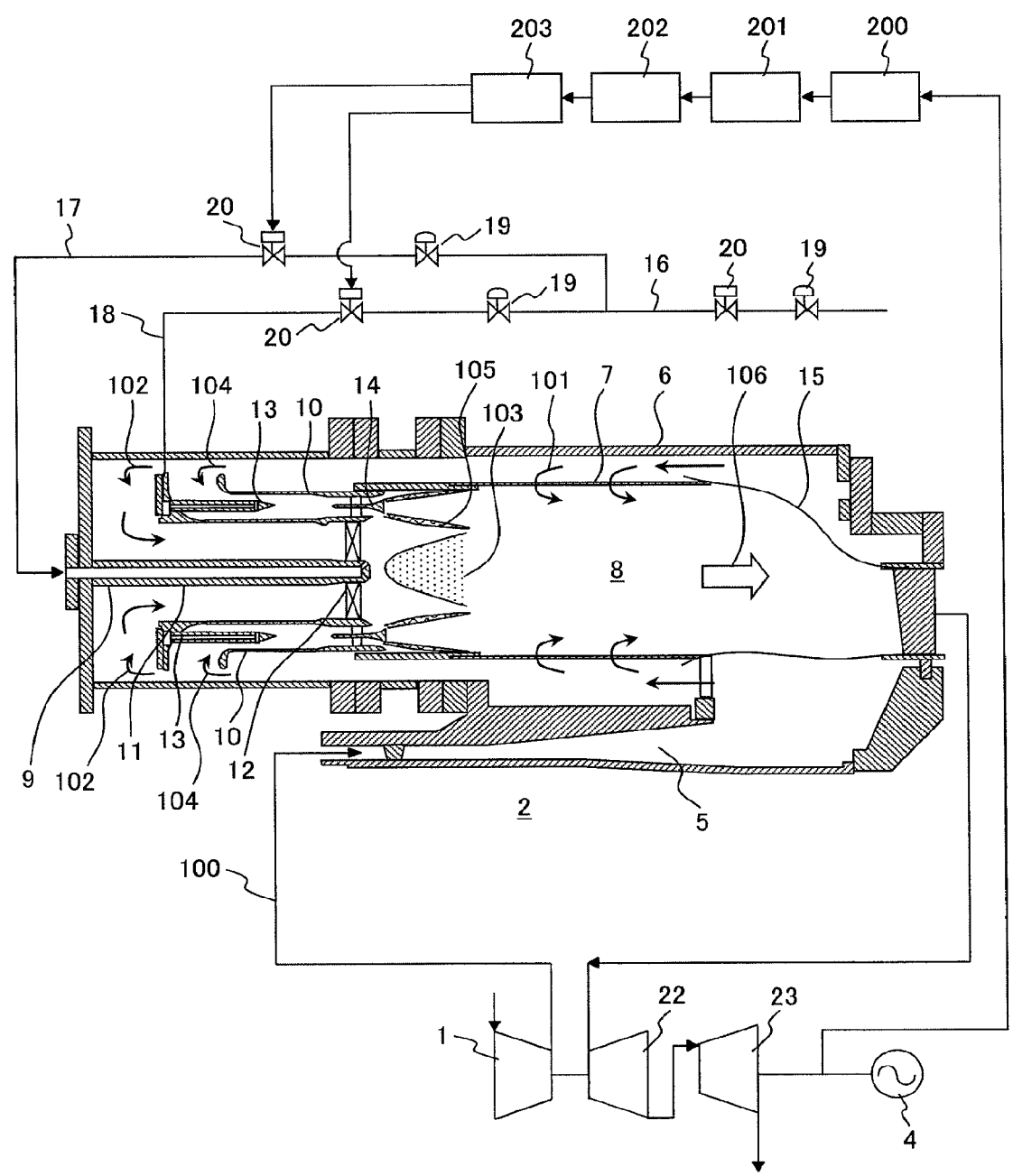
FIG. 12 is a block diagram of the gas turbine unit including the gas turbine combustor which is the sixth embodiment of the present invention.

FIG. 12 shows an entire drawing of the gas turbine unit for power generation including the gas turbine combustor 2 that is the sixth embodiment of the present invention and this embodiment is an embodiment when the control apparatus of the gas turbine combustor 2 having the aforementioned constitution is applied to a biaxial gas turbine unit.

The biaxial gas turbine unit, as shown in FIG. 12, is a biaxial gas turbine that the axis for connecting the compressor 1 and a high pressure turbine 22 and the axis for connecting the generator 4 and a low pressure turbine 23 are two separated axes.

The gas turbine combustor 2 of this embodiment includes the detector 200 for detecting the rotating speed of the gas turbine in the low pressure turbine 23.

Figure 13:
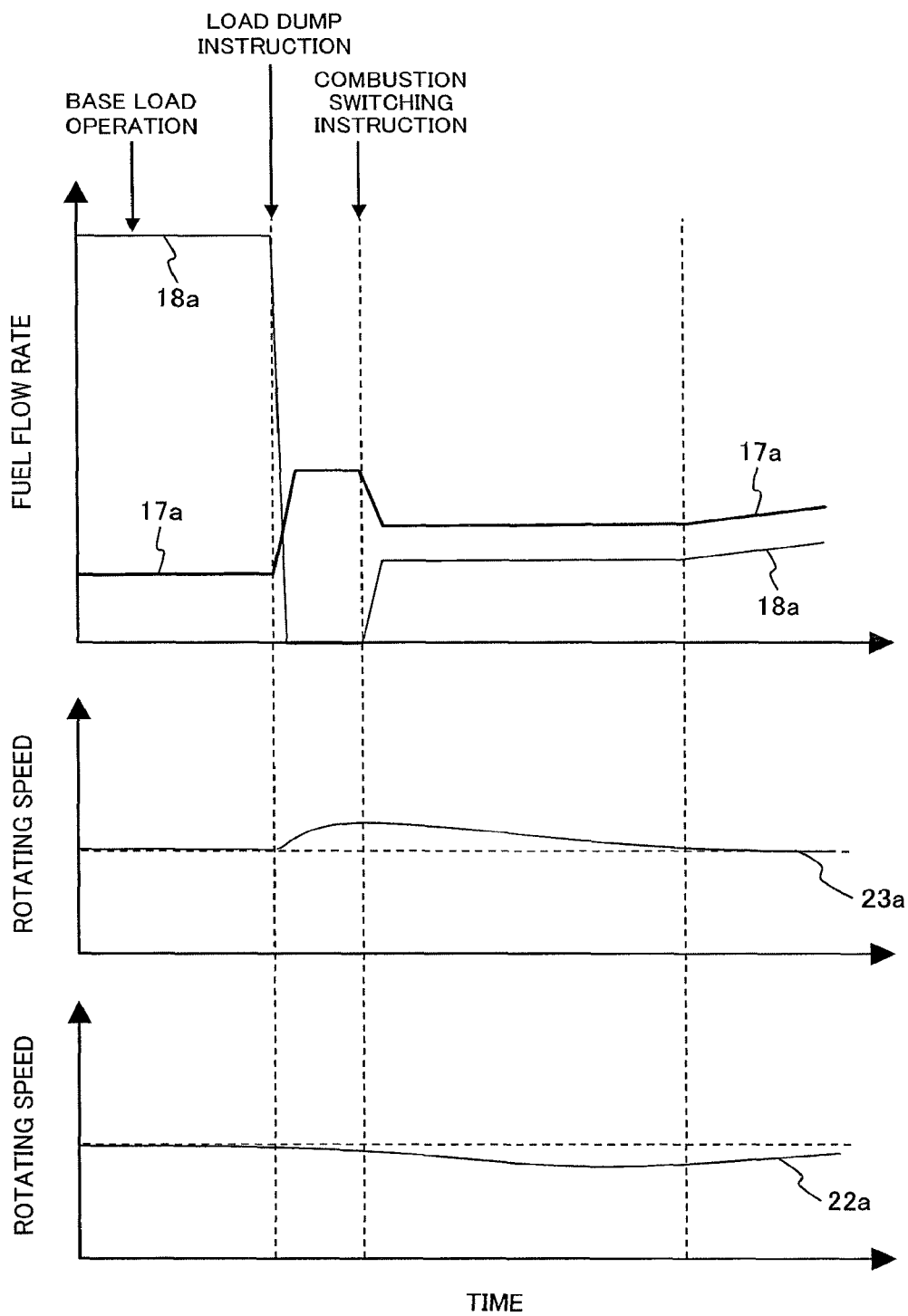
FIG. 13 is a characteristic diagram showing the fuel flow rate, the rotating speed of the low-pressure turbine, and the rotating speed of the high-pressure turbine at the time of load dump in the sixth embodiment of the present invention.

FIG. 13 shows, at the time of the load dump of the gas turbine in the control apparatus of the gas turbine combustor 2 of this embodiment, the changes with time of the diffusion combustion burner fuel flow rate 17a and the premix combustion burner fuel flow rate 18a which are fed via the diffusion combustion burner fuel system 17 and the premix combustion burner fuel system 18 and the changes with time of a turbine rotating speed 23a of the low pressure turbine 23 and a turbine rotating speed 22a of the high pressure turbine 22.

As shown in FIG. 13, in correspondence to the load dump of the gas turbine, the turbine rotating speed 23a of the low pressure turbine 23 connected to the generator 4 increases, so that to suppress the increase in the rotating speed of the low pressure turbine 23, the fuel flow rate fed to the gas turbine combustor 2 is reduced and the combustion form is switched to the independent diffusion combustion.

The fuel flow rate fed to the gas turbine combustor 2 is reduced, thus the rotating speed 23a of the low pressure turbine 23 is slowly reduced down to the rated rotating speed.

A detection signal of the turbine rotating speed of the low pressure turbine 23 detected by the rotating speed detector 200 is transmitted to the recorder 201 and the information of the rotating speed of the low pressure turbine 23 is preserved by the recorder 201. From the information of the rotating speed of the low pressure turbine preserved in the recorder 201, the change with time of the rotating speed of the low pressure turbine is calculated by the rotating speed trend arithmetic unit 202.

When it is detected by the arithmetic unit 202 that the rotating speed increased immediately after the load dump of the gas turbine starts to reduce due to a reduction in the fuel flow rate, a signal is transmitted to the fuel control unit 203 from the rotating speed trend arithmetic unit 202. The fuel control unit 203 receiving the signal transmitted from the rotating speed trend arithmetic unit 202, so that the combustion form of the gas turbine combustor 2 is switched from the independent diffusion combustion to the mixed combustion of the diffusion combustion and premix combustion, controls so as to reduce the diffusion combustion burner fuel flow rate 17a which is fed to the diffusion combustion burner 9 of the gas turbine combustor 2 via the diffusion combustion burner fuel system 17 and increase the premix combustion burner fuel flow rate 18a which is fed to the premix combustion burner 10 via the premix combustion burner fuel system 18.

The high pressure turbine 22 serves as a function of driving the compressor 1, so that the fuel flow rate reduces after the load dump of the gas turbine, thus the rotating speed reduces slowly. Therefore, when the rotating speed 23a of the low pressure turbine 23 increases once, then starts to reduce, and approaches the rated rotating speed, so as to switch the combustion form of the gas turbine combustor 2 from the independent diffusion combustion to the mixed combustion of the diffusion combustion and premix combustion, increase the diffusion combustion burner fuel flow rate 17a and the premix combustion burner fuel flow rate 18a which are fed to the diffusion combustion burner fuel system 17 and the premix combustion burner fuel system 18, and increase again the rotating speed 22a of the high pressure turbine 22 up to the rated rotating speed, the fuel flow rate is controlled by the fuel control unit 203.

The control apparatus of the gas turbine combustor 2 is structured as this embodiment, thus even in the biaxial gas turbine unit, the combustion form can be promptly switched from the independent diffusion combustion to the mixed combustion of the diffusion combustion and premix combustion after the load dump of the gas turbine and the NOx emission in the full speed no-load operation state can be reduced.

According to this embodiment, a method and an apparatus for controlling a gas turbine combustor capable of ensuring combustion stability immediately after the load dump of the gas turbine and reducing the NOx emission due to the full speed no-load operation after the load dump can be realized.

The present invention can be applied to the gas turbine combustor.

What is claimed is:

1. A method for controlling a gas turbine combustor including a diffusion combustion burner and a premix combustion burner, comprising the steps of:
   detecting a rotating speed of a gas turbine;
   recording a detected value of the rotating speed of the gas turbine;
   calculating a value of a change of the rotating speed with respect to time of the gas turbine in accordance with the detected value of the rotating speed of the gas turbine;
   detecting an opening angle of a compressor bleed valve installed in a compressor;
   regulating a fuel flow rate fed to the gas turbine combustor on the basis of results of the value of the change of the rotating speed with respect to time of the gas turbine and a signal of the opening angle of the bleed valve; and
   controlling with a fuel control unit to control a fuel flow rate for a diffusion combustion to be fed to the diffusion combustion burner installed in the gas turbine combustor and a fuel flow rate for a premix combustion to be fed to the premix combustion burner so as to switch a combustion state of the gas turbine combustor from an independent diffusion combustion by the diffusion combustion burner to a mixed combustion of the diffusion combustion and the premix combustion by the diffusion combustion burner and the premix combustion burner, wherein:
   when it is detected that the rotating speed of the gas turbine increased from a rated rotating speed at a time that a load dump of the gas turbine begins to decrease and the opening angle of the bleed valve installed in the compressor is totally closed,
   regulating the fuel control unit to control the fuel flow rate fed to the gas turbine combustor; and
   switching the gas turbine combustor from the independent diffusion combustion by the diffusion combustion burner to the mixed combustion of the diffusion combustion and the premix combustion by the diffusion combustion burner and the premix combustion burner by respectively controlling the fuel flow rate for the diffusion combustion fed to the diffusion combustion burner and the fuel flow rate for the premix combustion fed to the premix combustion burner.

* * * * *